(12) United States Patent
Shen

(10) Patent No.: US 9,027,082 B2
(45) Date of Patent: May 5, 2015

(54) HANDLING OF PUBLIC IDENTITIES

(75) Inventor: Jiadong Shen, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/508,632

(22) PCT Filed: Nov. 10, 2009

(86) PCT No.: PCT/EP2009/064885
§ 371 (c)(1),
(2), (4) Date: May 8, 2012

(87) PCT Pub. No.: WO2011/057657
PCT Pub. Date: May 19, 2011

(65) Prior Publication Data
US 2012/0227084 A1    Sep. 6, 2012

(51) Int. Cl.
*G06F 21/00*   (2013.01)
*H04L 29/06*   (2006.01)
*G06F 15/16*   (2006.01)
*G06F 15/173*  (2006.01)
*H04L 29/08*   (2006.01)

(52) U.S. Cl.
CPC ......... *H04L 65/1073* (2013.01); *H04L 65/1016* (2013.01); *H04L 67/30* (2013.01)

(58) Field of Classification Search
CPC .. H04L 63/1073; H04L 67/30; H04L 65/1016
USPC ................. 726/2; 709/225; 455/435.3, 414.1; 370/352
See application file for complete search history.

(56) References Cited

U.S. PATENT DOCUMENTS 8,195,155 B2    6/2012  Terrill et al.
2006/0035637 A1*  2/2006  Westman ............... 455/435.3
2008/0176538 A1*  7/2008  Terrill et al. ........... 455/414.1
(Continued)

FOREIGN PATENT DOCUMENTS

CN     1994016 A     7/2007
JP   2008/539628 A   11/2008
(Continued)

OTHER PUBLICATIONS

Abdalla, M.; De Caro, A.; Duong Hieu Phan; "Generalized Key Delegation for Wildcarded Identity-Based and Inner-Product Encryption"; Information Forensics and Security, IEEE Transactions on vol. 7, Issue: 6; DOI: 10.1109/TIFS.2012.2213594; Publication Year: Nov. 2012; pp. 1695-1706.*
(Continued)

*Primary Examiner* — Kambiz Zand
*Assistant Examiner* — Courtney Fields
(74) *Attorney, Agent, or Firm* — Harrington & Smith

(57) ABSTRACT

The invention relates to a subscriber data entity, method and a computer program product for defining a first record including a wildcarded public user identity covering plurality of public user identities of users, defining a second record including a public user identity of a user, wherein the public user identity belongs to the plurality of public user identities which the wildcarded public user identity covers and assigning the first record and the second record to the same registration set, wherein the registration set includes public user identities to be registered together.

17 Claims, 8 Drawing Sheets

(56) References Cited

U.S. PATENT DOCUMENTS

2009/0190573 A1   7/2009   Siegel et al. .................. 370/352
2012/0158964 A1*  6/2012   Van Elburg et al. .......... 709/225

FOREIGN PATENT DOCUMENTS

| WO | WO 2007/021223 A1 | 2/2007 |
| WO | WO 2008/089673 A1 | 7/2008 |
| WO | WO 2008/101547 A1 | 8/2008 |
| WO | WO 2008/101838 A2 | 8/2008 |
| WO | WO 2008101547 A1 * | 8/2008 |
| WO | WO 2009/052870 A1 | 4/2009 |

OTHER PUBLICATIONS

3GPP TS 23.003 V8.6.0 (Sep. 2009), "3rd Generation Partnership Project; Technical Specification Group Core Network and Terminals; Numbering, addressing and identification (Release 8)", 65 pgs.

3GPP TS 23.228 V8.10.0 (Sep. 2009), "3rd Generation Partnership Project; Technical Specification Group Services and System Aspects; IP Multimedia Subsystem (IMS) (Release 8)", 248 pgs.

* cited by examiner

HANDLING OF PUBLIC IDENTITIES

TECHNICAL FIELD OF THE INVENTION

The present invention relates to a mechanism for registering public user identities. In particular, the present invention is related to a method and apparatus for registration mechanism, which comprises public user identities to be registered together.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these. Session Description Protocol (SDP) is a protocol which conveys information about media streams in multimedia sessions to allow the recipients of a session description to participate in the session. The SDP offers and answers can be carried in SIP messages. Diameter protocol has been defined by IETF and is intended to provide an Authentication, Authorization and Accounting (AAA) framework for applications such as network access or IP mobility.

Generally, for properly establishing and handling a communication connection between network elements such as a user equipment and another communication equipment or user equipment, a database, a server, etc., one or more intermediate network elements such as control network elements, support nodes, service nodes and interworking elements are involved which may belong to different communication networks.

The IMS can support wildcarded public user identities (IMPU). The wildcarded IMPU concept has been introduced to cover a range/group of IMPUs to simplify administration efforts, with the pre-condition that all IMPUs within a wildcarded IMPU are assigned to the same service profile. Furthermore, distinct IMPU was defined as public user identity to identity an IMS user.

An example of a wildcarded IMPU, all Tel-URIs can begin with +123 for a company behind an IP private branch exchange (IP-PBX). Extended Regular Expression (ERE) can be used to define a wildcarded IMPU. Such a wildcarded IMPU can have the format of "tel:+123!.*!"

As seen, wildcarded public user identities can enable optimisation of the operation and maintenance of the nodes for the case in which a large amount of users are registered together and handled in the same way by the network. However, there are cases that some of the IMPUs covered by a wildcarded IMPU shall have different service profiles, for example, directors of the company. However, as mentioned above all IMPUs covered by a wildcarded IMPU can only have the same service profile.

SUMMARY OF THE INVENTION

The present invention overcomes the above problem by providing a subscriber data entity, a method and a computer program product comprising:

defining a first record comprising a wildcarded public user identity covering plurality of public user identities of users;

defining a second record comprising a public user identity of a user, wherein the public user identity belongs to the plurality of public user identities which the wildcarded public user identity covers; and assigning the first record and the second record to the same registration set, wherein the registration set comprises public user identities to be registered together.

The registration set can comprise an implicit registration set (IRS).

The subscriber data entity, method and/or computer program product can further comprise one of more of the following:

assigning different service profiles for the first record and the second record.

transmitting to a session control entity the public user identities to be registered together, during a registration operation relating to one of the public user identities to be registered together.

checking, during a registration operation associated with a public user identity, first, if the public user identity matches with any of records not comprising wildcarded public user identities, and after that, if the public user identity matches with any of records comprising wildcarded public user identities, and wherein the records comprising wildcarded public user identities are checked only if no match is found among the records not comprising wildcarded public user identities.

A home subscriber server (HSS) or a subscription locator function (SLF) of an internet protocol multimedia subsystem (IMS).

Controlling that a public user identity of a user which is only defined as the wildcarded public user identity covering plurality of public user identities of the users, can not be registered explicitly.

Further, a subscriber data entity, a method and a computer program product are provided, comprising:

defining a first record comprising a wildcarded public service identity covering plurality of public service identities;

defining a second record comprising a public service identity, wherein the public service identity belongs to the plurality of public service identities which the wildcarded public service identity covers; and assigning the first record and the second record to the same registration set, wherein the registration set comprises public service identities to be registered together.

Further, a subscriber data entity, a method and a computer program product are provided, comprising:

maintaining public user identities, comprising maintaining public user identities defined as distinct public user identities and as wildcarded public user identities;

registering public user identities to a network, wherein public user identities can be registered a.) explicitly, and b.) implicitly together with another explicitly registered public user identity;

controlling a registration of a public user identity, wherein the controlling comprises not allowing explicit registration of the public user identity, if the public user identity matches a maintained wildcarded public user identity and does not match any of the maintained distinct public user identities.

The registering public user identities implicitly can comprise registering public user identities which have been defined in the same registration set as the other explicitly registered public user identity.

Embodiment of the present invention may have one or more of following advantages:
  Improved flexibility to maintain identities ands range of identities.
  Better control for registration of identities.

DETAILED DESCRIPTION OF THE INVENTION

Figure 1:
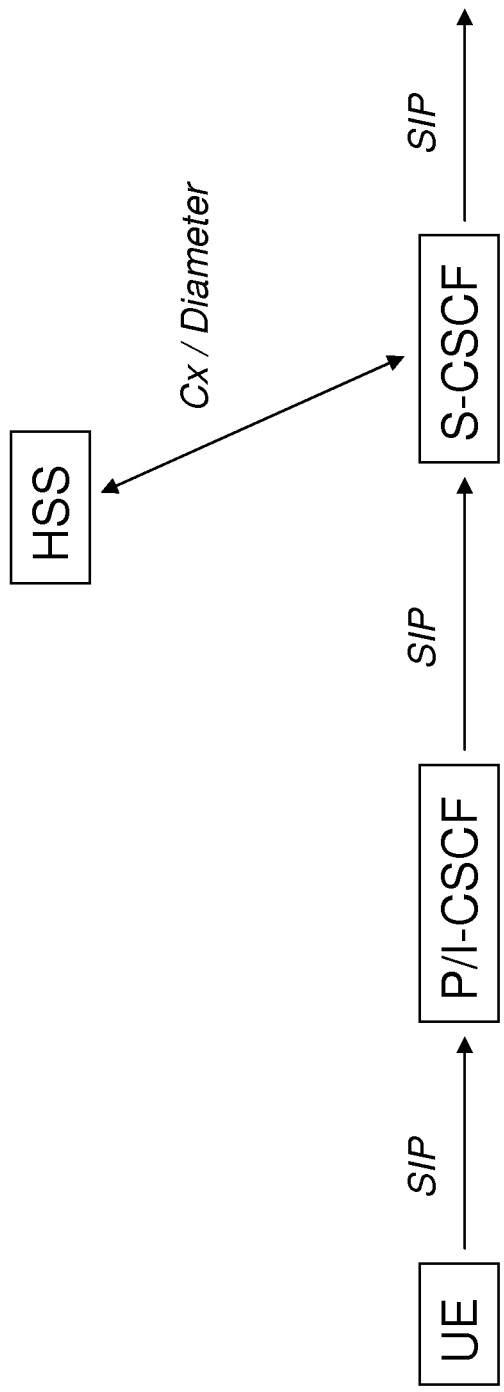
FIG. 1 illustrates network architecture relevant for embodiments of the invention.

Figure illustrates architecture of an IMS network. Different types of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing a SIP registration and routing SIP requests received from another network towards the S-CSCF. The S-CSCF can perform the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF can provide services to registered and unregistered users when it is assigned to these users. This assignment can be stored in the Home Subscriber Server (HSS).

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc. The HSS can be responsible for holding the following user related information:
  User Identification, Numbering and addressing information
  User Security information: Network access control information for authentication and authorization, such as password information
  User Location information at inter-system level: the HSS supports the user registration, and stores inter-system location information, etc.
  User profile information.

Cx reference point or Cx interface is an interface between a CSCF and a HSS, supporting the transfer of data between them. The Cx reference point is based on the diameter protocol with 3GPP standard diameter applications. Sh interface is a corresponding interface between the HSS and an AS. Diameter is an authentication, authorisation, and accounting (AAA) protocol defined by the IETF and used for network access services, such as dial-up and mobile IP. The Diameter base protocol is evolved from the remote authentication dial-in user service (RADIUS) protocol.

Diameter multimedia client and Diameter multimedia server implement the Diameter multimedia application. The client is one of the communicating Diameter peers that usually initiates transactions. Examples of communication elements that may implement the Diameter multimedia client are the I-CSCF and S-CSCF. An example of a Diameter multimedia server is the HSS.

In the IMS, the assignment of the S-CSCF takes place when the first SIP request for a user arrives at an S-CSCF. The S-CSCF then tries to download a user profile of the user from the HSS using Server-Assignment-Request (SAR). SAR request is a Diameter command message that a Diameter multimedia client can send to a Diameter multimedia server to request the server to store the name of the server (the S-CSCF) that is currently serving the user. The interface between the S-CSCF and the HSS is called Cx interface. If no S-CSCF is previously assigned to this user, the HSS can assign the S-CSCF to this user and provide the user profile to the S-CSCF using Diameter Server-Assignment-Answer (SAA) response over Cx interface.

User-Authorization-Request message (UAR) is a Diameter command message that a Diameter multimedia client can send to a Diameter multimedia server to request the authorisation of the registration of a multimedia user. User-Authorization-Answer message (UAA) is a Diameter command message that a server can send as a response to a previously received User-Authorization-Request message. The UAA can include a service profile of the user.

Cx interface exist between both the HSS and the I-CSCF, and the HSS and the S-CSCF. In order to support the S-CSCF selection described above and to allow the S-CSCF to perform its tasks, the Cx interface must support transferring following information:
  transfer of CSCF-UE security parameters from HSS to CSCFs. The security parameters allow the CSCFs and the UE to communicate in a trusted and secure way.
  transfer of service parameters of the subscriber from HSS to CSCFs. This may include e.g. service parameters, Application Server (AS) address, triggers, information on subscribed media etc. The information on subscribed media is provided in the form of a profile identifier; details of the allowed media parameters associated with the profile identifier are configured in the S-CSCF.
  transfer of CSCF capability information from HSS to CSCFs. This may include e.g. supported service set, protocol version numbers etc.
  transfer of session signalling transport parameters from CSCFs to HSS. The HSS stores the signalling transport parameters and they are used for routing mobile terminated sessions to the Serving-CSCF. The parameters may include e.g. IP-address and port number of CSCFs, transport protocol etc. The information mentioned above shall be transferred before the CSCF is able to serve the user. It shall also be possible to update this information while the CSCF is serving the user, for example if new services are activated for the user.

A subscription locator function (SLF) is a function which enables an interrogating and serving call state control functions (I-CSCF and S-CSCF) to locate an address of the user mobility server that holds an IP multimedia subsystem (IMS) subscriber data for a given user identity. The subscription locator function can associate private and public user identities with the home subscriber server and service and subscription repository addresses. The subscription locator function can be used via the Dx, Yc, and Dh interfaces.

IP Multimedia (IM) private user identity (IMPI) is a user identity that is assigned by the home network operator and used, for example, for registration, authorisation, administration, and accounting purposes. The private user identity is stored in the IM services identity module (ISIM). For the UMTS subscriber identity module (USIM), the private user identity is derived from the international mobile subscriber identity (IMSI). The private user identity takes the form of a network access identifier (NAI). The private user identity identifies the user for the IMS and it is stored in the Home Subscriber Server (HSS).

IM public user identity (IMPU) is a user identity that is used by any user for requesting communications with other users. The public user identity takes the form of a SIP uniform resource identifier (URI) or E.164 number in form of TEL URI. Every IMS subscriber has one or more public user identities. At least one public user identity is stored in the IM services identity module (ISIM). The user equipment can receive more public identities from the IMS, where they are stored in the HSS. For a user with a UMTS subscriber identity module (USIM), a temporary public user identity is derived from the international mobile subscriber identity (IMSI). In some cases, the value will be the same as that of the private user identity.

Contact and contact address refer to Contact header of SIP. Contact provides a SIP URI that can be used to contact that specific instance of the UE for subsequent requests. The scope of the Contact can be global. That is, the Contact header field value contains a URI at which the UE would like to receive requests, and this URI is valid even if used in subsequent requests outside of any dialogs. A Contact header field value can contain a display name, a URI with URI parameters, and header parameters.

TEL URI is a uniform resource identifier (URI) address which identifies a connection to a terminal that handles normal voice telephone calls, a voice mailbox or other voice messaging system.

Figure 3:
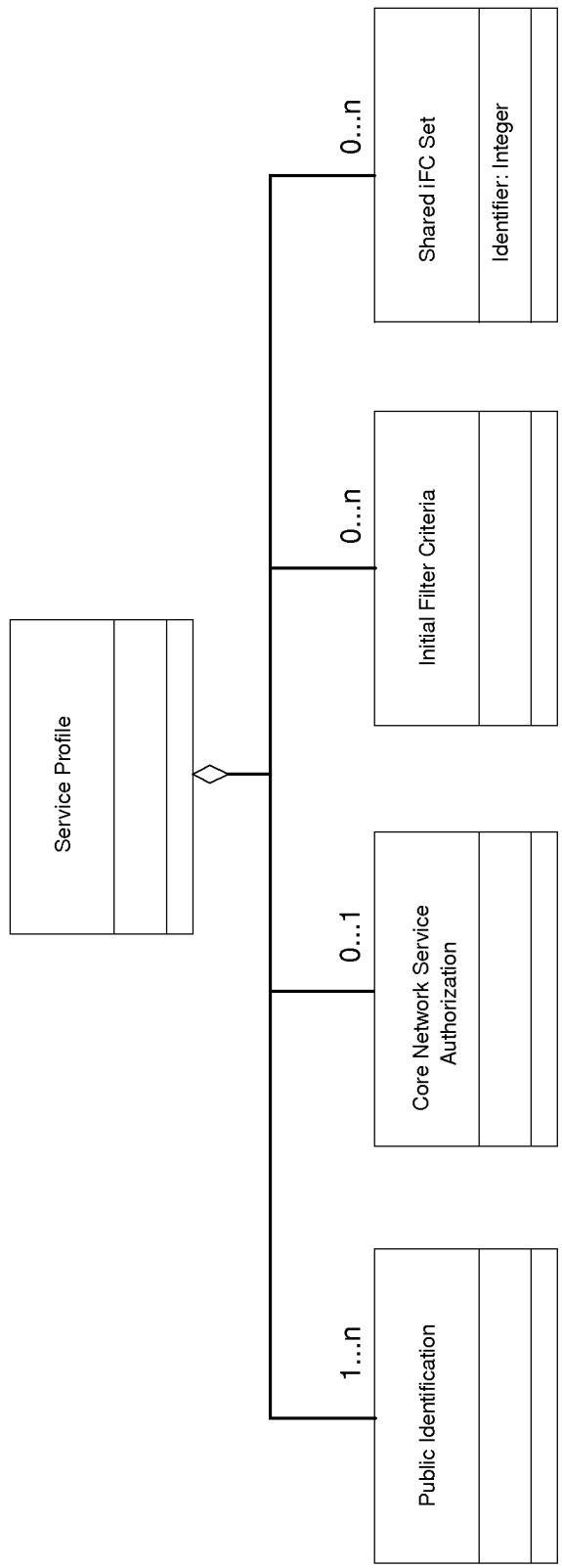
FIG. 3 illustrates a model of an IMS service profile.

FIG. 3 gives an outline of unified modelling language (UML) model of an IMS service profile. Each instance of a service profile class consists of one or several instances of the class public identification. A public identification class can contain public identities associated with that service profile. Information in the core network service authorization, initial filter criteria (iFC), and shared iFC set classes can apply to all public identification instances, which are included in one service profile class.

Each instance of the service profile class can contain zero or one instance of the class core network service authorization. If no instance of the class core network service authorization is present, no filtering related to subscribed media or restriction on IMS communication service identifiers (CSI) applies in the S-CSCF.

Each instance of the class service profile can contain zero or several instances of the class initial filter criteria (iFC) and/or zero or more instances of the class shared iFC set. A shared iFC set can point to a set of iFC locally administered and stored at the S-CSCF. Shared iFC sets may be shared by several service profiles.

Figure 4:
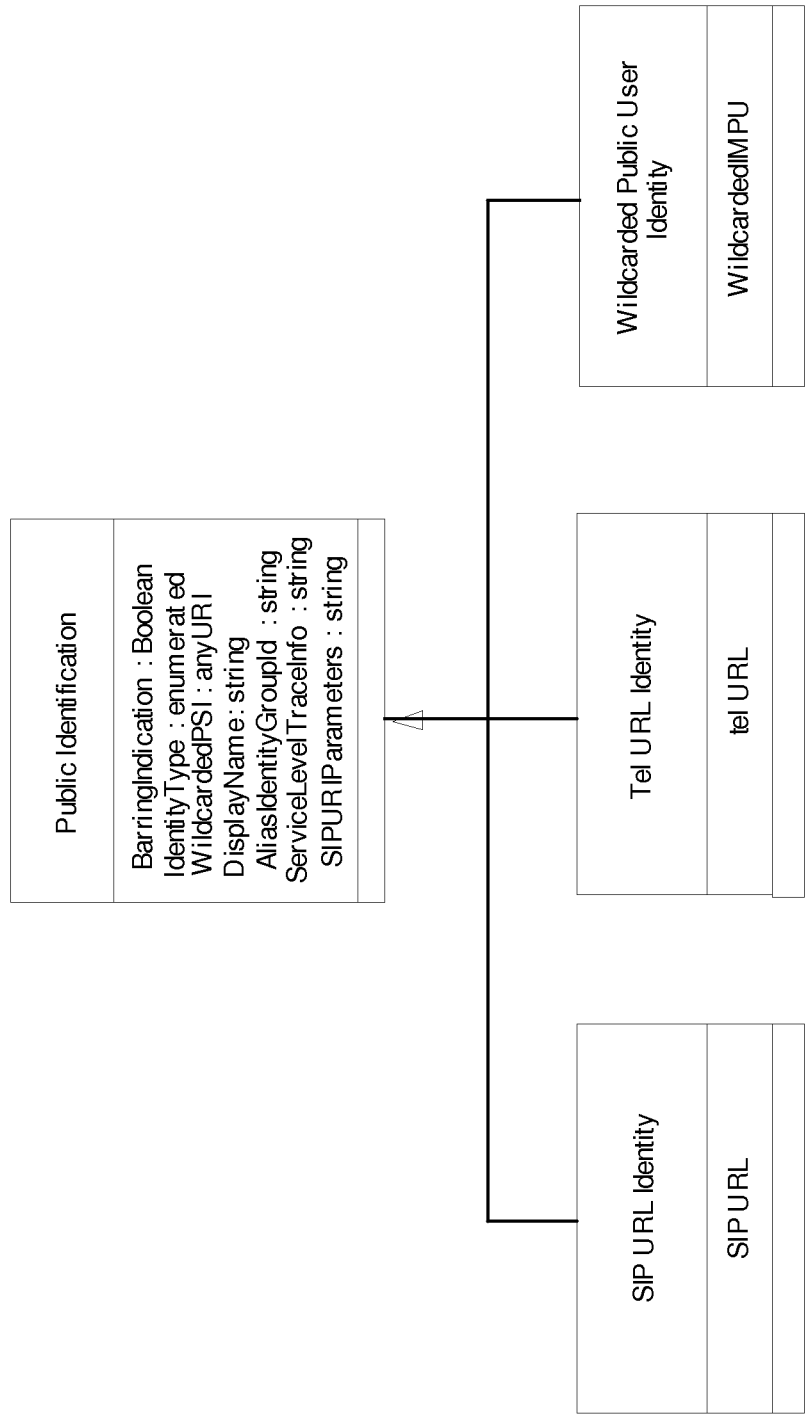
FIG. 4 illustrates a model of IMS public identification

FIG. 4 gives an outline of the UML model of IMS public identification class. A public identification class can contain either SIP URL identity, i.e. SIP URL, or Tel URL identity class, i.e. tel URL, or wildcarded public user identity.

Figure 2A:
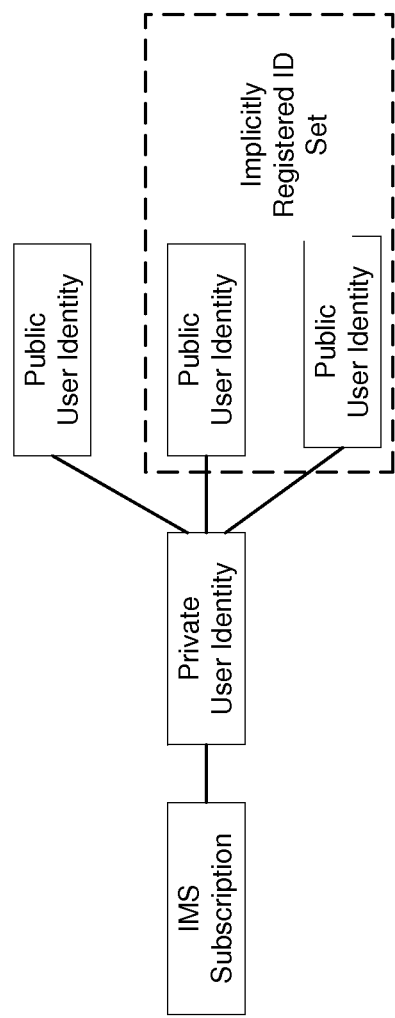
FIG. 2a illustrates a diagram of implicit registration set and public user identities.
Figure 2B:
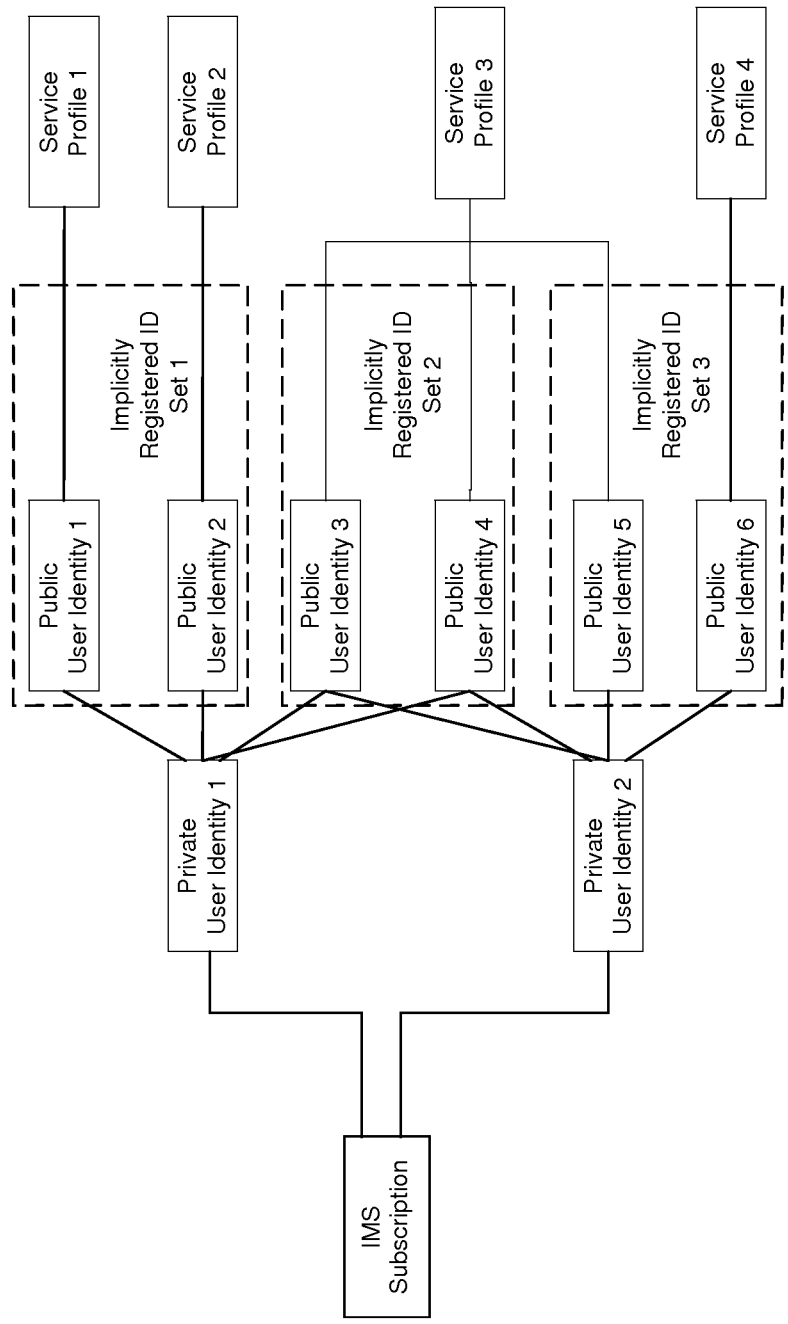
FIG. 2b illustrates a diagram when multiple private user identities (IMPI) are involved.

Implicit registration means that a user can have a set of Public User Identities (IMPUs) defined to be implicitly registered via single IMS registration of one of the Public User Identity's in that set. None of the public identities shall be considered as a master to the other public identities. FIG. 2a shows a simple diagram of implicit registration and Public User Identities. FIG. 2b shows a similar diagram when multiple Private User Identities (IPMPI) are involved.

In order to support implicit registration, one or more of following features can be implemented:
  HSS can have a set of Public User Identities that are part of implicit registration.
  Cx reference point between S-CSCF and HSS can support download of more than one or all Public User Identities associated with the implicit registration, during registration of any of the single Public User Identities within the set.
  All Public User Identities of an Implicit Registration set can be associated to the same Private User Identities. FIG. 2a illustrates an example of detailed relationship between the public and private user entities within an Implicit Registration set.
  When one of the Public User Identities within the set is registered, all Public user identities associated with the implicit registration set can be registered at the same time.
  When one of the Public User Identities within the set is de-registered, all Public User Identities that have been implicitly registered can be de-registered at the same time.
  Registration and de-registration can relate to a particular contact address and a particular Private User Identity. A Public user identity that has been registered (including when implicitly registered) with different contact addresses can remain registered in relation to those contact addresses that have not been de-registered.
  Public user identities belonging to an implicit registration set can point to different service profiles, or some of these Public User Identities can point to the same service profile.
  When a Public User Identity belongs to an implicit registration set, it cannot be registered or de-registered individually without the Public User Identity being removed from the implicit registration list.
  All IMS related registration timers can apply to the set of implicitly registered Public User Identities
  S-CSCF, P-CSCF and UE can be notified of the set of Public User Identities belonging to the implicitly registered function. Session set up can not be allowed for the implicitly registered Public User Identities until the entities are updated, except for the explicitly registered Public User Identity.
  The S-CSCF can store during registration all the Service profiles corresponding to the Public User Identities being registered.
  When a Public User Identity is barred from IMS communications, only the HSS and S-CSCF can have access to this Public User Identity.

The IMS can support a wildcarded public user identity. The wildcarded IMPU concept has been introduced to cover a range/group of IMPUs to simplify administration efforts, with the pre-condition that all IMPUs within a wildcarded IMPU are assigned to the same service profile. Furthermore, distinct IMPU was defined as public user identity to identity an IMS user. Public user identities can be stored in the HSS as wildcarded public user identities. A wildcarded public user identity represents a collection of public user identities that share the same service profile and are included in the same implicit registration set. Wildcarded public user identities can enable optimisation of the operation and maintenance of the nodes for the case in which a large amount of users are registered together and handled in the same way by the network.

A wildcarded public user identity expresses a set of public user identities grouped together. It shall be possible to include and express the wildcarded public user identity in the implicit registration set. An implicit registration of a wildcarded public user identity can be handled in the same manner as the implicit registration of a distinct public user identity from a network perspective, with only one service profile associated to the wildcarded public user identity. When the value of a public user identifier matches what is expressed as an implicitly registered wildcarded public user identity and there is no better match, then the procedures are the same as in the case that the identifier matches an implicitly registered distinct public user identity.

Wildcard analysis is a digit analysis in which the analysed digit sequence can end with a wildcard character. A wildcard character is a symbol that may be used to represent one or more characters.

An example of a wildcarded IMPU is given in following: All Tel-URIs begin with +123 for a company behind an IP private branch exchange (IP-PBX). Extended Regular Expression (ERE) can be used to define a wildcarded IMPU. Such a wildcarded IMPU can have the format of "tel:+123!.*!" However, there are cases that some of the IMPUs covered by a wildcarded IMPU shall have different service profiles, for example, directors of the company. However, as mentioned above all IMPUs covered by a wildcarded IMPU can only have the same service profile.

Currently the situation can be handled by defining the wildcarded IMPU in such a way that IMPUs having different service profiles are not covered by any wildcarded IMPU.

For example, if the chief executive officer (CEO) has a number +12344 and the chief financial officer (CFO) has a number +12345, it becomes difficult to define a single profile ERE to exclude these numbers. As an example several wildcarded IMPUs may be needed, for example: "tel:+1230!.*!", . . . ,"tel:+1233!.*!", "tel:+1235!.*!" . . . "tel:+1239!.*!", "tel:+12340!.*!", . . . "tel:+12343!.*!", "tel:+12346!.*!", "tel:+12349!.*!"

The disadvantage of such solution is that it makes the definition of wildcarded IMPUs more complicated. The benefit of wildcarded IMPU concept can hardly be achieved.

Basic system architecture of a communication network may comprise a commonly known architecture of a wired or wireless access network subsystem. Such an architecture comprises one or more access network control units, radio access network elements, access service network gateways or base transceiver stations, with which a user equipment is capable to communicate via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between user terminals and/or servers than those described in detail herein below.

Furthermore, the network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

A wildcarded IMPU can be defined as a regular expression. It can represent a collection of IMPUs that match the regular definition, share the same service profile and implicit registration set. The wildcarded IMPU concept can enable optimisation of the operation and maintenance of the nodes for the case in which a large amount of users are registered together.

The typical use case for a wildcarded IMPU is to handle identities of a private network. It would beneficial if certain IMPUs in the wildcarded IMPU range could have different service profile than the majority of the IMPUs in the wildcard IMPU range. For example, the chief like "sip:CEO@company.operator.com" should have possibility to have a service profile assigned which provide more or different services than a service profile assigned to a normal employees like "sip:engineer4325@ company.operator.com".

According to an aspect of the invention, an overlap may exist between a wildcarded IMPU and a distinct (individual) IMPU. This can avoid splitting of a wildcarded identities or the need for complicated regular expression (e.g. the simple wildcarded IMPU "sip:!.*!@ company.operator.com" need not be changed).

According to an aspect of the invention, it is not necessary to share the same service profile for the overlapping distinct and wildcarded IMPUs. The distinct IMPUs that match a wildcarded IMPU must be in the same implicit registration set (IRS) as the wildcarded IMPU.

If the overlapping distinct and wildcarded IMPUs were in different IRSs, then it may happen that the wildcarded IMPU is registered, but the distinct IMPU is not, in such case the terminating calls to the distinct IMPU can receive the terminating services of the wildcarded IMPU.

According to an aspect of the invention, as a result of a successful registration an IRS can be registered, and a contact can be assigned to all IMPUs in the IRS. Respectively, as a result of a successful deregistration an IRS can be deregistered, and a contact can be unassigned to all IMPUs in the IRS.

Using private networks as an example, allowing the (de)registration with any instance of a wildcarded IMPU can mean that any user in a private network can (de)register the whole private network. According to an aspect of the invention, to avoid unexpected registration status changes for a wildcarded IMPU, explicit registration can be allowed for distinct IMPUs only. For example, for a private network, an IMPU for the attendants can be defined as a distinct IMPU, which can still have the same service profile as the wildcarded IMPU.

As part of SIP registration, an IMPU can be included in a SIP REGISTER request, which is known as explicit registration in the IMS. Due to the implicit registration set, other IMPUs which have been defined in the same IRS except the one in the SIP REGISTER request can be registered implicitly. Currently it is also possible to use an instance of a wildcarded IMPU for the explicit registration. By allowing defining a distinct IMPU within the range of a wildcarded IMPU, defining a distinct IMPU for explicit registration can be made easier. According to an aspect of the invention, only a distinct IMPU shall be used for explicit registration. In this case, a subscriber data entity need not check wildcarded IMPUs for requests that can contain only a distinct IMPU (for example Cx-UAR and Cx-MAR requests). This can improve the total performance level of the subscriber data entity, as searching an IMPU within a wildcarded IMPU (regular expression) can require a lot of processor time since the subscriber data entity may have to conduct regular expression one by one until a match is found or no match exist at all. The search procedure in the subscriber data entity can be simplified by only searching within distinct IMPUs. A distinct public user identity can mean that the public user identities has been defined in the subscriber data entity as complete (in its full length, no wildcarding), for example, in an own record. Registering explicitly can mean a registration to the IMS in which a user selects one public user identity and registers only that public user identity. Implicit registration can mean a registration to the IMS in which a user has a set of defined public user identities to be registered via a single registration of one of those public user identities.

According to an aspect of the invention, it is allowed to define a distinct public user identity which is matching a wildcarded public user identity. These both identities must be in the same initial registration set (IRS), but can have different service profiles.

According to an aspect of the invention, when the value of a public user identifier matches what is expressed as an implicitly registered wildcarded public user identity but it is defined as a distinct public user identity as well, the service profile of the distinct public user identity shall be used.

Figure 5:
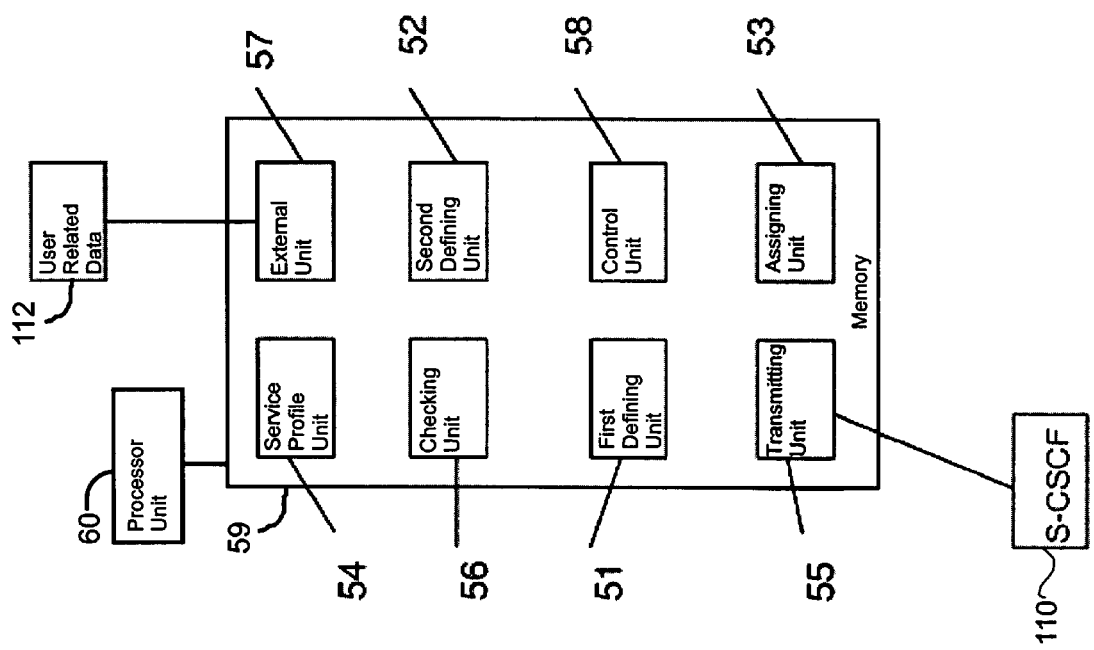
FIG. 5 illustrates an example internal structure and functions of an apparatus implementing aspects of the invention.

FIG. 5 illustrates an example internal structure and functions of an apparatus implementing aspects of the invention. A subscriber data entity can comprise a first defining unit 51 configured to define a first record comprising a wildcarded public identity covering plurality of public identities. A second defining unit 52 can be configured to define a second record comprising a public identity which can belong to the plurality of public identities which the wildcarded public identity covers (i.e. matches the range). In both defining units 51 and 52, the public identity can be, for example, a public user identity of a user, such as IMPU or a public service identity, such as PSI. An assigning unit 53 can be configured to assign the first record and the second record to the same registration set. The registration set can be an implicit registration set of the IMS and can define public identities to be registered together.

The subscriber data entity can comprise a service profile unit 54 configured to assign different service profiles for the first record and the second record. A subscriber data entity can comprise a transmitting unit 55 configured to transmit to a session control entity, such as S-CSCF, the public identities to be registered together, during a registration operation relating to one of the public identities which have been defined to be registered together. The transmitting unit 55 can transmit according to Diameter protocol and over Cx interface of the IMS. The transmitting unit 55 can transmit the information is a User-Authorization-Answer message (UAA) as a response to a previously received User-Authorization-Request (UAR) message.

The subscriber data entity can comprise a checking unit 56 configured to check first, if a identity matches with any of records not comprising wildcarded public identities, and after that, if the identity matches with any of records including wildcarded public identities. The records for wildcarded public identities can be checked only if no match is found among the records not including wildcarded public identities. The checking unit 56 can be configured to perform such check during a registration procedure of a user, for example, triggered by a user authentication request received from another network element, such as a serving call session control function (S-CSCF) 110 . The user authentication request can include the identity of the user to be authenticated.

An external unit 57 can be configured to receive external commands, for example, for creating, modifying and deleting user related data 112 in the subscriber data entity, such as public identities, wildcarded public identities, registration sets or user profiles. Part of the information can be stored outside the subscriber data entity and retrieved by the external unit 57.

The subscriber data entity can have a control unit 58 configured to control that only public identities which have been defined as distinct public identities (i.e. not only as wildcarded public identities), can be registered explicitly. The control unit 58 can be configured to control that an instance of a wildcarded public identity can not be used for explicit registration, but only implicitly, for example, by skipping the checking of wildcarded public identities when from the outset it can be determined that only a distinct public identity may be registered, e.g. based on the type of received registration request.

All units described above may be implemented for example using microprocessors, chips and/or other electrical components and/or by software. For example, the units 51-58 may be implemented in the form of software residing in memory 59 and executed by a processor unit 60.

A subscriber data entity may be physically implemented in a switch, router, server or other hardware platform or electronic equipment which can support data transmission and processing tasks, or can be implemented as a component of other existing device.

A (data) record in a subscriber data entity defining user identities can be an entry configured by an operator over an operating and maintenance (OAM) interface. For example, public user identities 1-6 in FIG. 2b can be considered as records.

According to an embodiment of the invention, the same logic can be applied to wildcarded public service identity (PSI) and distinct PSI, instead of public user identities.

Figure 6:
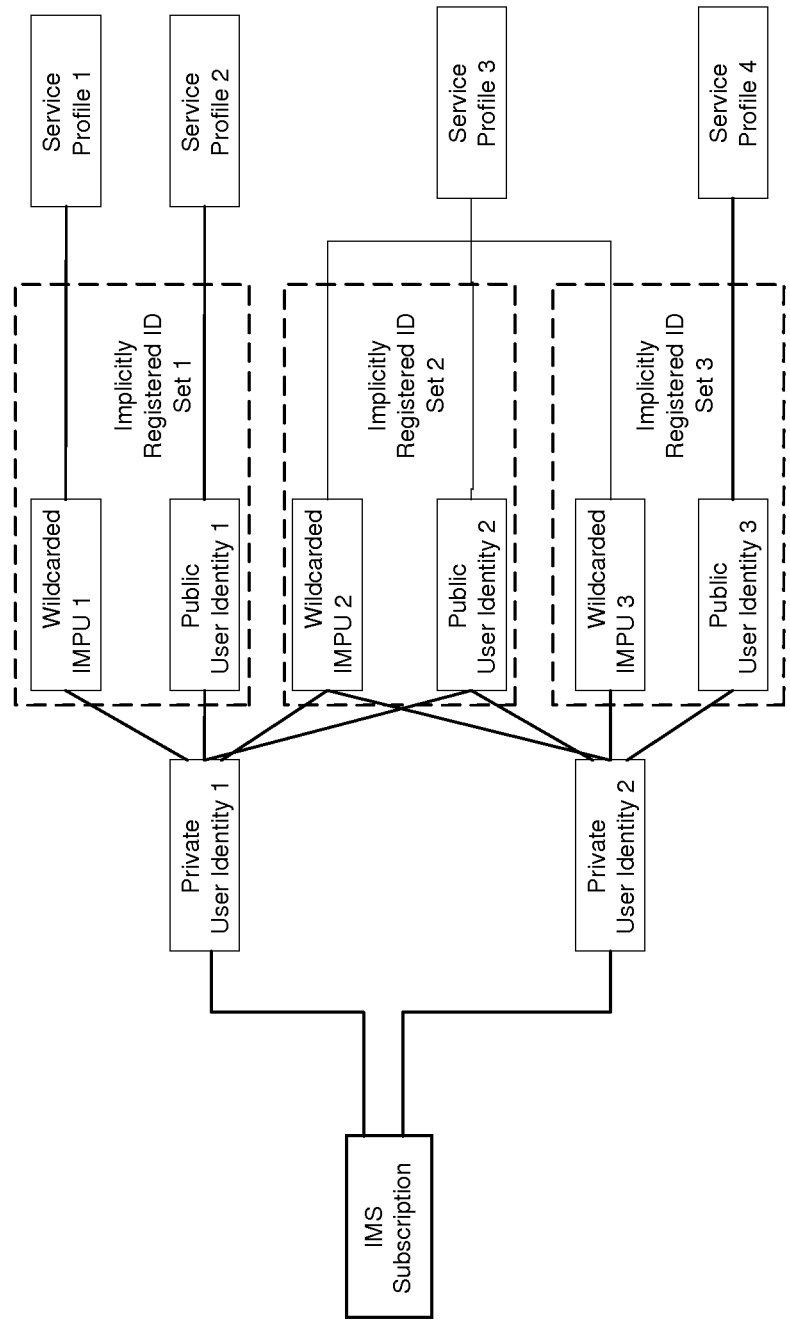
FIG. 6 illustrates a diagram of implicit registration set and public user identities according to aspects of the invention.

FIG. 6 illustrates example configuration of wildcarded public user identities and distinct public user identities according to some aspects of the invention. ISR 1 includes wildcarded IMPU 1 with assigned service profile 1 and distinct IMPU 1 with assigned service profile 2. ISR 2 includes wildcarded IMPU 2 with and distinct IMPU 2 which both have service profile 3 assigned. In ISR 3 wildcarded IMPU 3 and distinct IMPU 3 have different service profiles.

Figure 7:
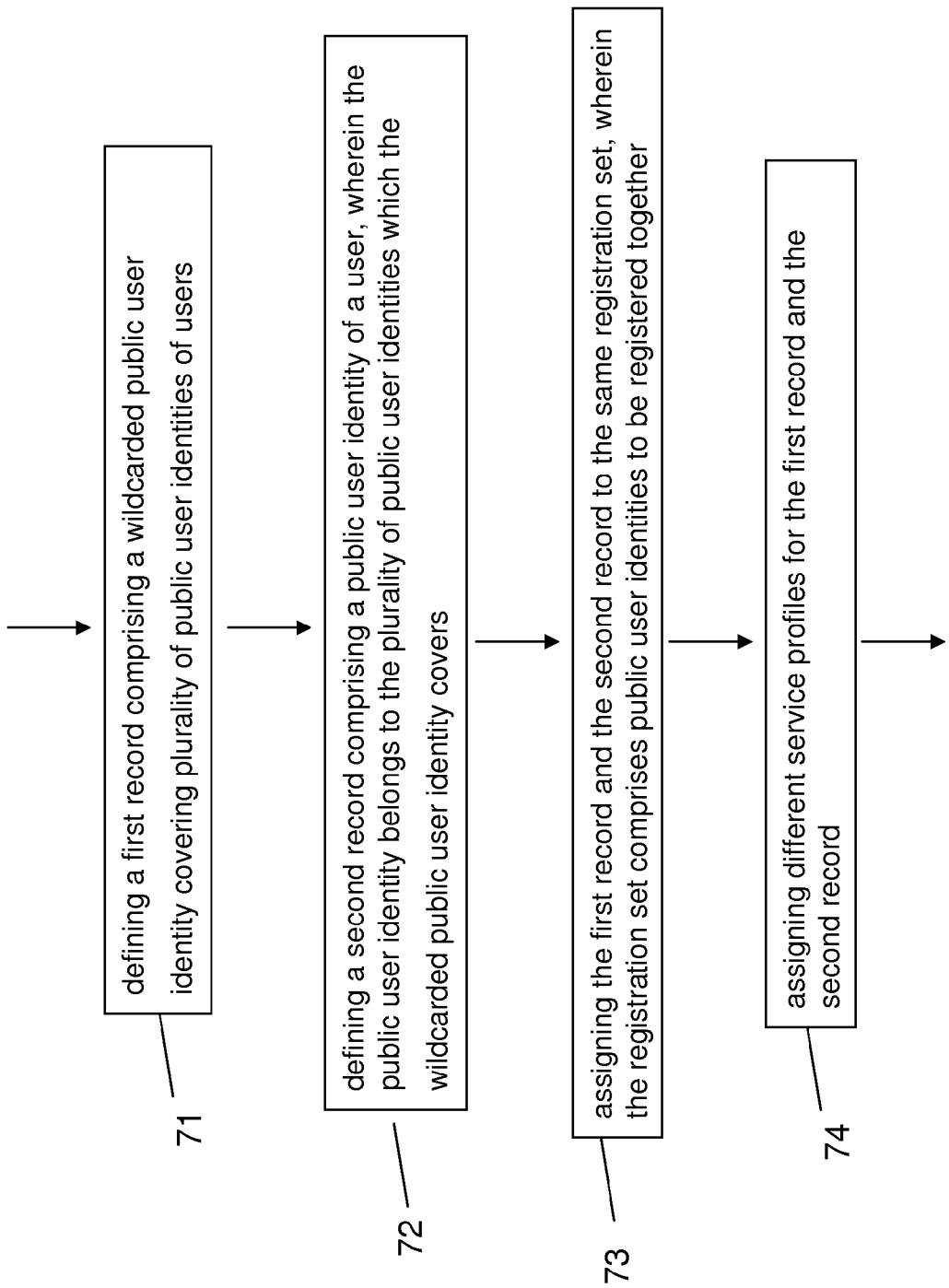
FIG. 7 illustrates an example process that can be implemented by an apparatus implementing aspects of the invention.

FIG. 7 illustrates an example process for implementing aspects of the invention. In 71 a first record is defined which include a wildcarded public user identity covering plurality of public user identities of users. In 72, a second record is defined which comprises a public user identity of a user, wherein the public user identity belongs to the plurality of public user identities which the wildcarded public user identity covers. In 73, the first record and the second record are assigned to the same registration set, wherein the registration set comprises public user identities to be registered together. In 74 different service profiles are assigned for the first record and the second record.

For the purpose of the present invention as described herein above, it should be noted that

- an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
- usable access networks may be any device, apparatus, unit or means by which a station, entity or other user equipment may connect to and/or utilize services offered by the access network; such services include, among others, data and/or (audio-) visual communication, data download etc.;
- a user equipment may be any device, apparatus, unit or means by which a system user or subscriber may experience services from an access network, such as a mobile phone, personal digital assistant PDA, or computer;
- method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

The invention is not limited public identity handling in the IMS network(s), but may also be applied in other type of networks having similar kind of subscriber data entity, different user profiles for services, and possibility to support multiple identities. Functions of the subscriber data entity described above may be implemented by code means, as software, and loaded into memory of a computer.

The invention claimed is:

1. An apparatus comprising:
at least one processor;
non-transitory memory storing a program of instructions;
wherein the memory storing the program of instructions is configured to, with the at least one processor, cause the apparatus to at least:
define a first record comprising a wildcarded public user identity covering a plurality of public user identities of users of a single service provider;
define a second record comprising a public user identity of a user of the single service provider, wherein the public user identity belongs to the plurality of public user identities which the wildcarded public user identity covers;
assign different service profiles for the first record and the second record; and
assign the first record and the second record to the same registration set, wherein the registration set comprises public user identities to be registered together.

2. The apparatus of claim 1, wherein the registration set comprises an implicit registration set.

3. The apparatus of claim 1, wherein the apparatus is further caused to transmit to a session control entity the public user identities to be registered together, during a registration operation relating to one of the public user identities to be registered together.

4. The apparatus of claim 1, wherein the apparatus is further caused to check, during a registration operation associated with a public user identity, first, if the public user identity matches with any records not comprising wildcarded public user identities, and after that, if the public user identity matches with any of records comprising wildcarded public user identities, and wherein the records comprising wildcarded public user identities are checked only if no match is found among the records not comprising wildcarded public user identities.

5. The apparatus of claim 1, wherein the apparatus comprises a home subscriber server or a subscription locator function of an interne protocol multimedia subsystem.

6. The apparatus of claim 1, wherein the apparatus is further caused to insure that a public user identity of a user which is only defined as the wildcarded public user identity covering plurality of public user identities of the users, cannot be registered explicitly.

7. A method comprising:
configuring a processor to control an apparatus to perform actions comprising:
defining a first record comprising a wildcarded public user identity covering plurality of public user identities of users of a single service provider;
defining a second record comprising a public user identity of a user of the single service provider, wherein the public user identity belongs to the plurality of public user identities which the wildcarded public user identity covers;
assigning different service profiles for the first record and the second record; and
assigning the first record and the second record to the same registration set, wherein the registration set comprises public user identities to be registered together.

8. The method of claim 7, wherein the registration set comprises an implicit registration set.

9. The method of claim 7, further comprising transmitting to a session control entity the public user identities to be registered together, during a registration operation relating to one of the public user identities to be registered together.

10. The method of claim 7, further comprising checking, during a registration operation associated with a public user identity, first, if the public user identity matches with any of records not comprising wildcarded public user identities, and after that, if the public user identity matches with any of records comprising wildcarded public user identities, and wherein the records comprising wildcarded public user identities are checked only if no match is found among the records not comprising wildcarded public user identities.

11. The method of claim 7, further comprising controlling that a public user identity of a user which is only defined as the wildcarded public user identity covering plurality of public user identities of the users, cannot be registered explicitly.

12. A method comprising:
configuring a processor to control an apparatus to perform actions comprising:
defining a first record comprising a wildcarded public service identity covering a plurality of public service identities of users of a single service provider;
defining a second record comprising a public service identity of a user of the single service provider, wherein the public service identity belongs to the plurality of public service identities which the wildcarded public service identity covers; and
assigning the first record and the second record to the same registration set, wherein the registration set comprises public service identities to be registered together.

13. A non-transitory computer readable medium storing a program of instructions, execution of which by a processor configures an apparatus to perform the method of claim 7.

14. An apparatus comprising:
at least one processor;
non-transitory memory storing a program of instructions;
wherein the memory storing the program of instructions is configured to, with the at least one processor, cause the apparatus to at least:
define a first record comprising a wildcarded public service identity covering plurality of public service identities of users of a single service provider;
define a second record comprising a public service identity of a user of the single service provider, wherein the non-central public service identity belongs to the plurality of public service identities which the wildcarded public service identity covers;
assign different service profiles for the first record and the second record; and
assign the first record and the second record to the same registration set, wherein the registration set comprises public service identities to be registered together.

15. An apparatus comprising:
at least one processor;
non-transitory memory storing a program of instructions;
wherein the memory storing the program of instructions is configured to, with the at least one processor, cause the apparatus to at least:
maintain public user identities of users of a single service provider, comprising maintaining public user identities defined as distinct public user identities and as wildcarded public user identities;
register public user identities to a network, wherein public user identities can be registered
a.) explicitly, and
b.) implicitly together with another explicitly registered public user identity;
control a registration of a public user identity, wherein the controlling comprises not allowing explicit registration of the public user identity, if the public user identity matches a maintained wildcarded public user identity of users of users of the single service provider, and does not match any of the maintained distinct public user identities of users of the single service provider.

16. The apparatus of claim 15, wherein registering public user identities implicitly comprises registering public user identities which have been defined in the same registration set as the other explicitly registered public user identity.

17. A method comprising:
configuring a processor to control an apparatus to perform actions comprising:
maintaining public user identities of users of a single service provider, comprising maintaining public user identities defined as distinct public user identities and as wildcarded public user identities;
registering public user identities to a network, wherein public user identities can be registered
a.) explicitly, and
b.) implicitly together with another explicitly registered public user identity;
wherein the registering further comprises not allowing explicit registration of a public user identity, if the public user identity matches a maintained wildcarded public user identity of users of the single service provider and does not match any of the maintained distinct public user identities of a user of the single service provider.

* * * * *

UNITED STATES PATENT AND TRADEMARK OFFICE
CERTIFICATE OF CORRECTION

| | | |
|---|---|---|
| PATENT NO. | : 9,027,082 B2 | Page 1 of 1 |
| APPLICATION NO. | : 13/508632 | |
| DATED | : May 5, 2015 | |
| INVENTOR(S) | : Shen | |

It is certified that error appears in the above-identified patent and that said Letters Patent is hereby corrected as shown below:

In the Claims

Claim 5, col. 13, line 3 "interne" should be deleted and --internet-- should be inserted.

Signed and Sealed this
Twenty-third Day of June, 2015

Michelle K. Lee
*Director of the United States Patent and Trademark Office*